Oct. 17, 1967  IKUYA NODA ET AL  3,347,076
METHOD AND APPARATUS FOR MANUFACTURING H-SHAPED STEEL
Filed Nov. 3, 1964  7 Sheets-Sheet 1

INVENTOR.

BY (a)      (b)

INVENTOR.

BY

United States Patent Office 3,347,076
Patented Oct. 17, 1967

3,347,076
METHOD AND APPARATUS FOR MANUFACTURING H-SHAPED STEEL
Ikuya Noda, Akira Yamamoto, Takashi Ueta, Hisao Minami, and Ryo Hirano, Himeji-shi, Fujio Someno, Tokyo, and Koichi Sudo, Kamaishi-shi, Japan, assignors to Fuji Iron & Steel Co., Ltd., Tokyo, Japan
Filed Nov. 3, 1964, Ser. No. 408,559
Claims priority, application Japan, Nov. 5, 1963, 38/59,844; May 22, 1964, 39/28,555; July 7, 1964, 39/38,675, 39/38,676
6 Claims. (Cl. 72—201)

ABSTRACT OF THE DISCLOSURE

The disclosure relates to a method of manufacturing steel H-shapes having large ratios of flange thickness to web thickness, or having extremely thin webs. In accordance with the disclosure, the temperature difference between the web and the flange, during hot rolling, is maintained at a very small value, by force cooling the flange and preventing cooling of the web by cooling water and the like.

The disclosure also relates to apparatus including means for force cooling the flanges during hot rolling of the H-shapes and novel cover and gutter means for preventing coolant, used to cool the rolls, from dripping onto the web of the H-shape being rolled.

Background of the invention

This invention relates to a method of manufacturing steel H-shapes having excellent qualities both as to profile and as to properties, preventing irregularity of form of steel H-shapes, such as waviness in the web or irregular bending during manufacturing process. Such irregularity is seen particularly in steel H-shapes having a very large ratio of flange thickness to web thickness compared with its nominal sectional size (such steel H-shapes generally have large web heights) or one having an extremely thin web, although the ratio of web thickness to flange thickness is limited to a small value.

Further, this invention relates particularly to a method of manufacturing steel H-shapes having the web to flange thickness ratio of approximately 1 to 3.

Still further, this invention relates to an apparatus for carrying out the above mentioned methods of manufacturing steel H-shapes advantageously.

Furthermore this invention relates to an apparatus to prevent the disadvantage of cooling water for the roll body and roll neck bearings of an upper horizontal roll in a roughing universal rolling mill, or in a finishing universal rolling mill used to manufacture steel H-shapes, flowing down or leading down onto the web of a steel H-shape being rolled by said rolling mills after cooling said roll body and roll neck bearings.

Additionally, this invention relates to a side-guide which guides the material to be rolled into each rolling mill and is provided with spraying nozzles, for a cooling agent, on the guiding surface for said material in a manner such that openings of nozzles do not project beyond said guiding surface.

Usually, the ratio of web thickness to flange thickness of a conventional steel H-shape is within a range of 1:1 to 2, and such a structural shape has good sectional efficiency. Such H-shapes are used in various applications due to the fact that such use makes it possible to reduce costs and construction time, and it is known that such shapes are very useful as structural elements because of the simplicity of combining and joining the same together and with other structural shapes. H-shapes are also used as piling and as temporary construction materials, due to their high support strength, easy transportation and construction. They are not only usable as foundation pilings but also are characterized by their ability to be rigidly jointed to superstructures and a superiority in horizontal strength, as well as the ability for repeated use as a temporary structural assembly. It is possible to save cost and time of construction when used in many fields of applications, and it is widely known that it is used particularly as a structural material, because of its simpleness to make sectional combination and jointment. Also it is generally used as piling and temporary constructing material, because of its large supporting strength, easy transportation and construction, and usability as a foundation piling, as well as its ability to make a firm joining to upper constructions and superiority in horizontal strength and ability to be repeatedly used as a temporal assembly.

As for the minimum thickness of the web of such conventional steel H-shapes, it varies depending on the size of the H-shaped steel; for example, the minimum thickness of the web would be limited to $12^{mm.}$ in case of a steel H-shape having $600^{mm.}$ web height and $300^{mm.}$ flange width, and the minimum thickness of the web would be $10^{mm.}$ in case of $600^{mm.}$ web height and $200^{mm.}$ flange width, and in the process of producing such conventional steel H-shapes having these dimensions, such difficulties as waviness in the web, irregular bending, etc., would scarcely take place.

However, in the case of steel H-shapes, having greater ratios of flange thickness to web thickness, or greater web heights than the H-shapes mentioned above, as well as the case of steel H-shapes having much thinner webs than mentioned above even though the ratio of flange thickness to web thickness is within the mentioned range, a large temperature difference between the web and flange appears in the final step of the rolling process, and is caused by the difference between the thermal capacities of the web and flange, due to thickness difference between web and flange. This introduces a difference of cooling rate caused by a difference of rate of heat radiation due to the difference of surface area of these two parts, and rapid cooling of the web takes place due to leaking down or scattering of cooling water, from the roll and roll neck bearings of the rolling mill, onto the web. In the cooling stage of the manufacturing process, the flange will continue to shrink as it cools after the web has nearly reached its final temperature, which consequently will generate contractive stress in the flange. This contractive stress has a value such as to exert considerable influence on the web and will, in most cases cause a wavy web or irregular bending of the finished products resulting in inferior profiles and properties of steel H-shapes. Especially the product having a thin web is liable to have such disadvantages due to decreased power of resistance of the web against the contractive stress of the flange.

In an article "Waviness in the Webs of Lightened Beam" of STAL, Oct. 1963, occurrence of waviness in the webs of H-shaped steel rolled by grooved rolls is described, and it is worthy to notice that it has been proposed in that article that it is better to set the webs vertically and to approach flanges of steel H-shapes than to set the flanges vertically, with respect to the cooling of steel H-shapes. But it is also reported that the web will have always waviness in its cooling process if the thickness ratio of flange to web is above 1.85, even when the above cooling method is applied.

The inventors have engaged in extensive research regarding a method to prevent the inferiority of profile and properties of above described H-shaped steel, and have found out that the object can be attained by the temperature difference between the web and the flange of H-shaped steel as small as possible. In this case, H-shaped steel manufacturing process includes roughing universal rolling step, finishing universal rolling step and hot sawing step.

The apparatus of the invention involves the above-mentioned inventive concept, in that it includes, in an apparatus for rolling steel H-shapes, side guides for the shapes provided with means for spraying coolant onto the guiding surfaces thereof. The second feature of the apparatus is the provision of means for preventing the dripping of coolant, used to cool the roll body and roll neck bearings of an upper horizontal roll in a roughing or finishing universal rolling mill, from flowing or leaking onto the web of the shape being rolled by the mills. The third feature of the apparatus involves the side guide used in rolling H-shapes of steel and provided with a plurality of nozzles for spraying coolant onto the guiding surfaces thereof so that flanges of the steel H-shapes are force cooled to maintain, at as small a value as possible, the temperature difference between the web and the flanges.

The above described objects and the other objects will be made clear in following illustrations and drawings.

Figure 1:
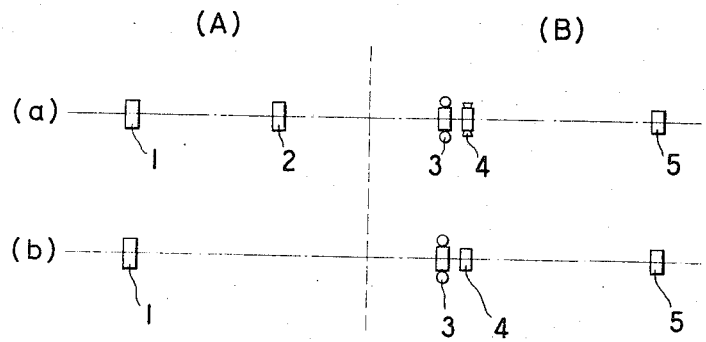
FIG. 1 is a plan view showing a rolling mill train to manufacture H-shaped steel.
Figure 2:
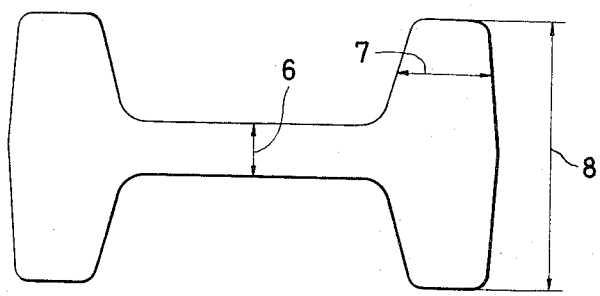
FIG. 2 is an elevation view showing the profile of a shaped bloom used in making steel H-shapes.
Figure 4:
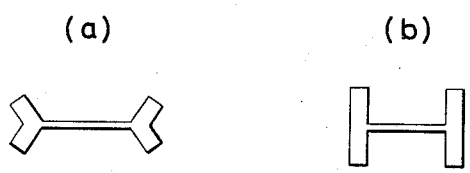

FIGS. 4a, b are elevation views showing the profile of steel H-shapes illustratively to be rolled in the rolling mill train shown in FIG. 1.

Figure 5:
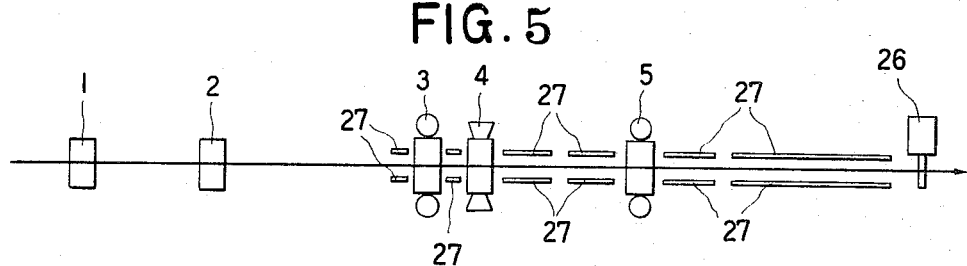

FIG. 5 is a plan showing a rolling mill train of the type shown in FIG. 1 and to which this invention is applied.

Figure 6:
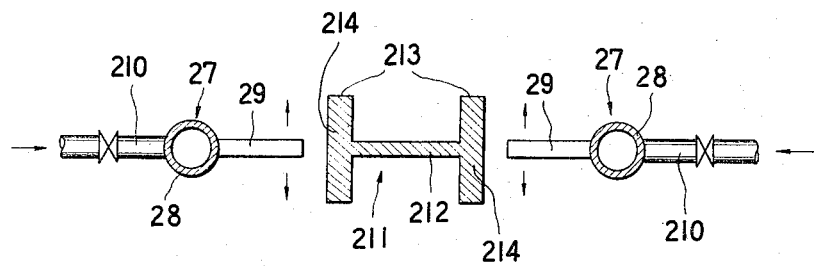
Figure 6:
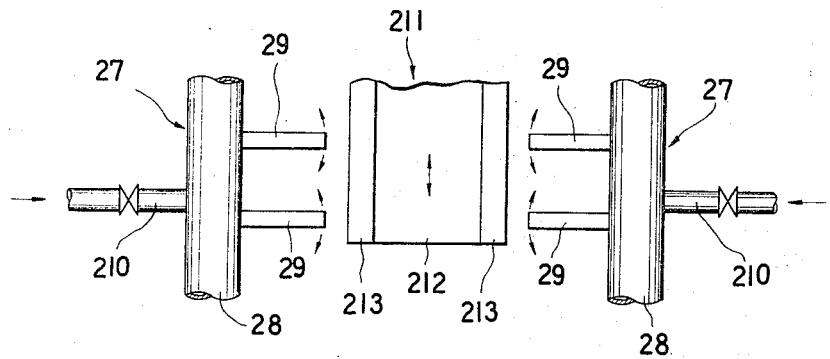

FIGS. 6a and 6b are an elevation view and a plan view showing principal parts of FIG. 5.

Figure 7:
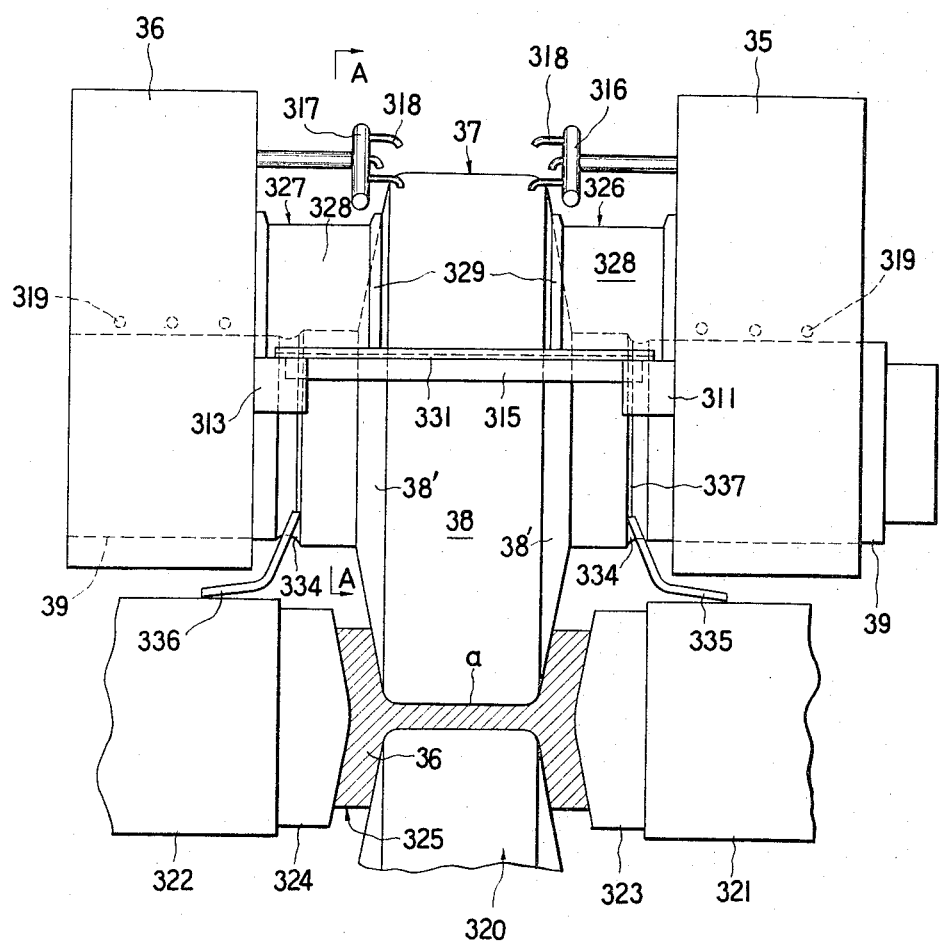

FIG. 7 is an elevation view showing the operation of rolling steel H-shapes in the universal rolling mill and showing the apparatus of this invention.

Figure 8:
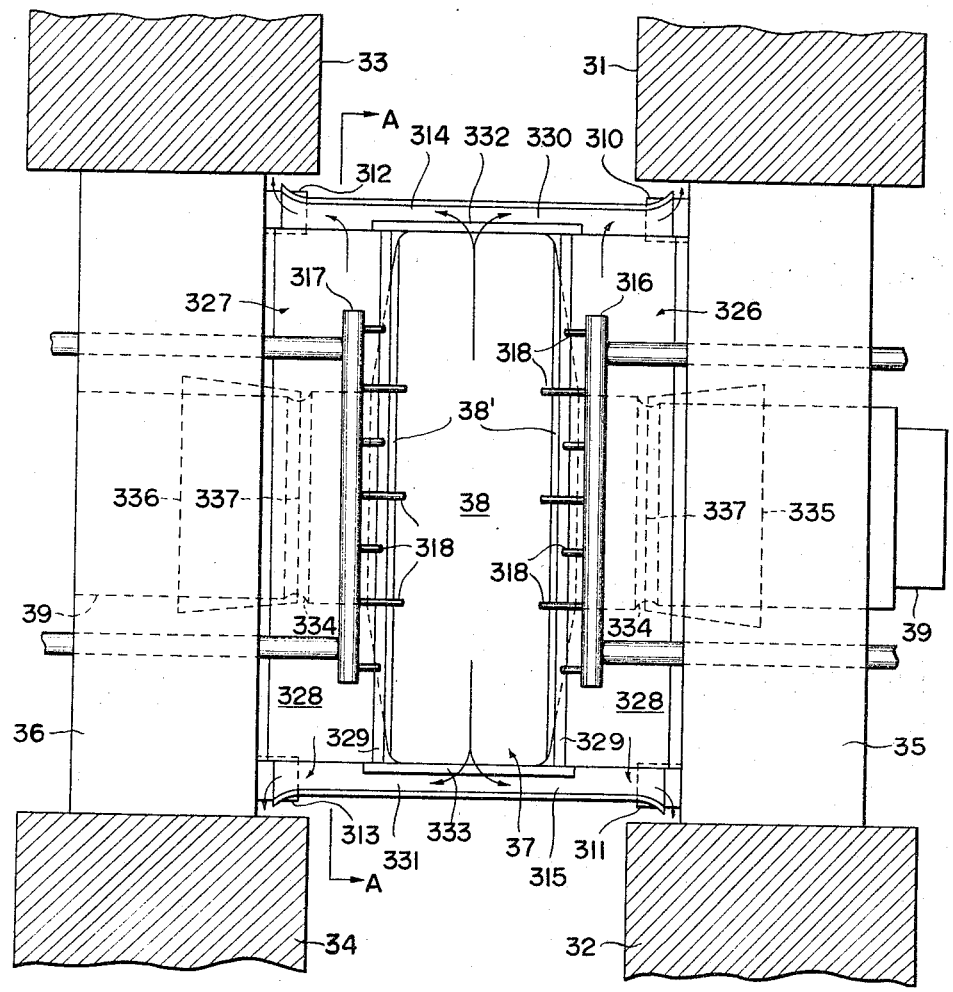

FIG. 8 is a plan view, partially in section, of FIG. 7.

Figure 9:
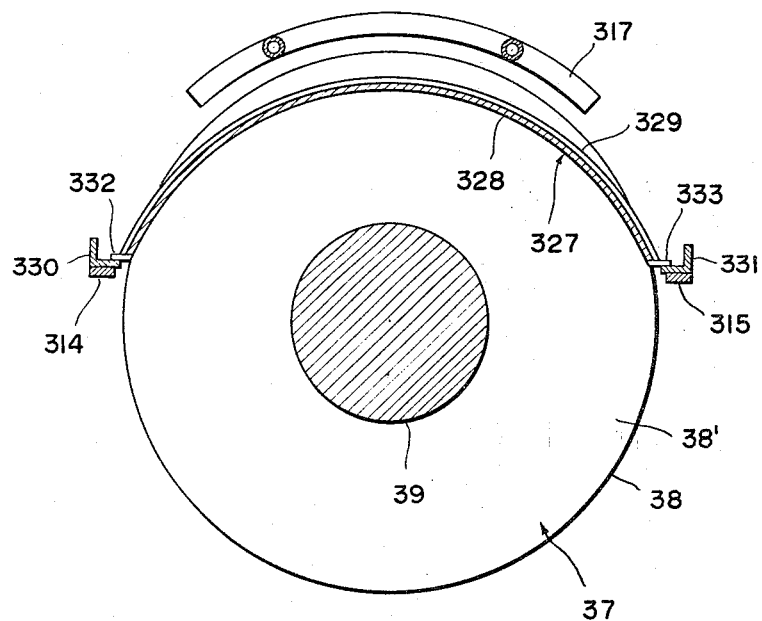

FIG. 9 is a vertical section on the line A—A, FIG. 7 and FIG. 8.

Figure 10:
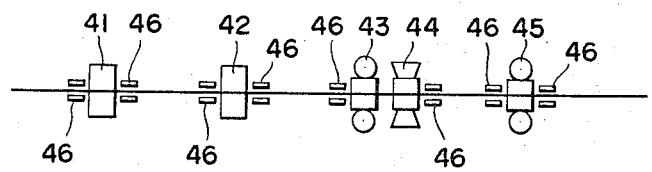

FIG. 10 is a plan showing the positions of the side-guide in a rolling mill train.

Figure 11:
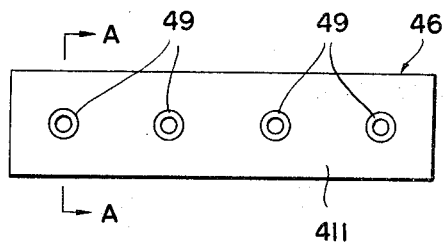

FIG. 11 is a side elevation showing an apparatus having fixed type spray nozzles for coolant.

Figure 12:
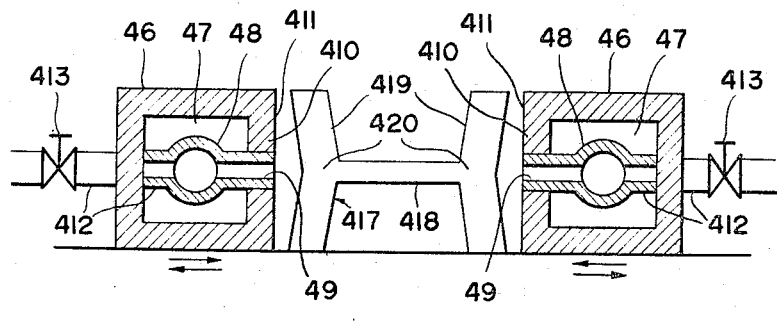

FIG. 12 is a vertical section on the line A—A of FIG. 11.

Figure 13:
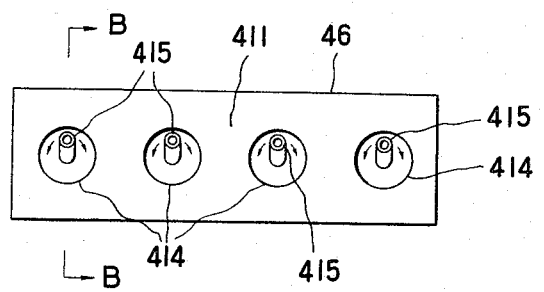

FIG. 13 is a side elevation showing a side-guide having adjustable coolant nozzles.

Figure 14:
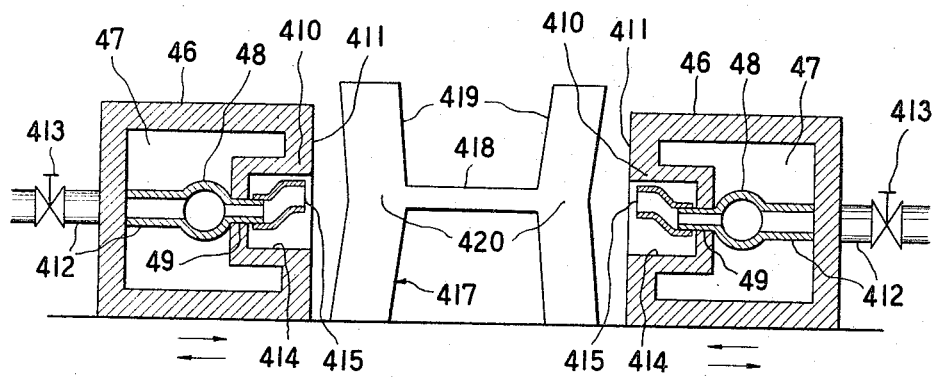

FIG. 14 is a vertical section on the line B—B of FIG. 13.

Referring to FIGS. 1 through 6, in the usual process of hot rolling various steel H-shapes, a universal rolling mill train is used as shown in FIGS. 1a and 1b. An ingot is rolled into a shaped bloom by a blooming mill 1 and/or by a break-down mill 2. But, in this step, the thicknesses of the web and the flange are still so great that the temperature difference between the web and the flange is very small. The bloom is then given a number of back and forth passes, such as more than eleven passes, in the roughing rolling mill train comprising a universal roll stand 3 and an edging stand 4. Thereby, the bloom is shaped to such an extent that the thickness of the web and the flange, and the width of the flange, closely approximate those of the finished shape as shown in FIG. 4a. The work is then rolled, with a slight reduction in one or more passes, to straighten the flanges into the normal shape, and to finish its profile to given dimensions, by the finishing universal rolling mill 5, to attain the final profile as shown in FIG. 5b.

During rolling of the work in the rolling mill components 3, 4 and 5 of FIG. 1 or FIG. 5, a large temperature difference will be created between the web and the flanges of the shape due to dripping or leaking of cooling water, used to cool a roll body and roll neck bearings onto the web, as well as to the difference of thermal capacity between the web and the flanges due to differences of thickness, and differences of radiation area etc. In accordance with the invention, the temperature difference between the web and flanges is made as small as possible by providing, in the rolling mill, apparatus to prevent dropping and leakage of cooling water in each of the rolling mill components 3, 4 and 5 of FIG. 1 or 5, or to blow water off the web by jetting high pressure steam, air, or water on the entry and delivery sides of each rolling mill stand to minimize the temperature drop in the web, or to apply forced cooling of the high temperature flanges at suitable points during the rolling of steel H-shapes. Thereby, it is possible to make the elongation, by rolling, of the web and the flanges very close to equal, and thus the rolling operation can be carried out without difficulty.

In this case, the temperature difference between web and flange is maintained within a range of 0° to about 200° C., but naturally the smaller the temperature difference the better.

High pressure water is used generally as a cooling agent in this invention, but high pressure air, high pressure steam, Freon gas, Dry Ice, etc., may be used optionally.

When force cooling both flanges, it is desirable to discharge coolant against the outer surface of the flanges, protecting the web against force cooling, and discharge of cooling over the entire outer surface of each flange, in a universal manner, is permissible. However, the joint between the flanges and the web of a steel H-shape usually has the largest thermal capacity and thus the highest temperature. Therefore, it is desirable to use force cooling in a manner to discharge the coolant against these joints.

Thereby it becomes possible to make the temperatures of the jointed portion and the web close to equal and to make residual stresses as small as possible and, as a result, it is found that steel H-shapes having excellent profiles and properties, and free from waviness in the web and from irregular bending, which is expected in the cooling process after rolling, can be manufactured without trouble.

It is desirable to arrange spray nozzles of this invention in such a way that the angle of the jet of cooling agent can be adjusted both in the vertical and horizontal planes because, since different sizes of steel H-shapes having different flange widths are rolled, it is obviously desirable to adjust the height of jets above the top line of the table rollers or adjust the angle of the jets in a vertical plane to impinge on the jointed portion of the web and the flange, which is approximately at the center of the flange width, to obtain the most desirable results by force cooling. In addition, it is desirable to direct the flow of cooling agent in the direction opposite to the travel of the steel H-shape to get better cooling efficiency of the jets. Therefore it is also desirable to make the nozzles adjustable in the horizontal plane.

When the web height of steel H-shapes varies depending on their sizes, it is desirable to make the distance between the ends of nozzles and the outer surfaces of the flanges adjustable. For this purpose, coolant spray nozzles are provided on side-guides (guiding apparatus for material to be rolled) which are provided on the entry and delivery sides of each rolling mill.

The number of nozzles will not necessarily be limited to a particular value, and may be selected suitably according to the kinds, dimensions, rolling conditions etc. of the material to be rolled.

FIG. 5 illustrates the present invention as applied to the rolling mill train shown in FIG. 1, and illustrates coolant spraying devices 27 arranged along both sides of the path of travel of the material being rolled. The coolant spraying devices 27 can be provided at any selected positions, as shown in FIG. 5, beginning with the entry side of a roughing universal mill 3 and extending to the entry side of a hot sawing machine 26 used in manufacturing steel H-shapes. As best seen in FIGS. 6a and 6b, each coolant spray device 27 comprises a header 28 provided with a selected number of nozzles 29 facing the flanges 213 of the work 211 to be rolled, and each header 28 is connected to a supply pipe 210. Nozzles 29 are preferably connected to headers 28 through flexible tubes or joints so that the angles of the nozzles may be adjustable in the vertical plane as shown by the arrows in FIG. 6a, and in a horizontal plane, as shown by the arrows in FIG. 6b. It is further desirable to make the distance between the outlet of each nozzle 29 and the adjacent flange adjustable in correspondence to the height of the web 212 of the material being rolled.

An example of a rolling process in case high pressure water is used as the cooling agent is shown as follows.

(1) Position of cooling:
Entry side of the roughing universal roll stand 3, delivery side of the edging stand 4, and between the roughing universal roll stand and edging stand. Entry side and delivery side of the finishing universal mill 5.

(2) Number of nozzles: 40–80.

(3) Quantity of water: 0.2–1.0 m.³/sec./nozzle.

(4) Velocity of water: 3–8 m./sec.

(5) Number of passes and rolling speed: More than 11 passes at 2–8 m./sec. and an additional 3–7 cooling passes at 1–5 m./sec. in the roughing universal mill stands 3 and 4. 1–7 passes, all cooling passes, take place at 0.5–5.0 m./sec. in the finishing universal rolling mill 5. Practical examples of the foregoing are shown in Table 1 hereinafter.

When the method of the invention as thus far described is practiced, it is possible to obtain steel H-shapes which have excellent profiles and properties, are free from waviness in the web, are free from irregular bending, and lack other disadvantages characteristic of H-shapes hitherto rolled. Additionally, the invention is particularly adaptable to manufacturing steel H-shapes having excellent sectional properties and in which the ratio of the thickness of the web to the flange is of the order of 1:3.

Figure 3:
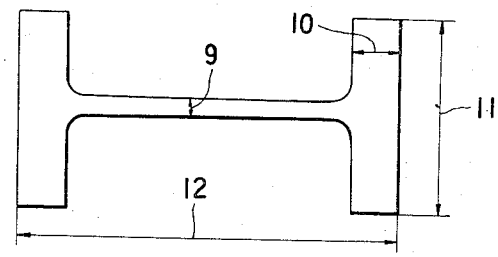
FIG. 3 is an elevation view showing the profile of steel H-shapes according to this invention.

Referring again to FIGS. 1 to 3, a steel ingot is rolled in a roughing rolling process into a shaped bloom in which the ratio of the web thickness 6 to the average flange thickness is 1:2–3. In this case, the average flange thickness is taken as the thickness 7 at about the middle portion of each flange and which approximates a trapezoid. The reason for using a thickness ratio of 1:2–3 in the shaped bloom is to balance the rate of reduction of the web and the rate of reduction of the flange in the universal rolling process to avoid an excessive temperature difference between the web and the flanges in the heating and rolling process, and to avoid difficulties in operation at a heating furnace or a holding furnace when the bloom is re-heated prior to universal finishing rolling. It is desirable to have the width 8 of the flanges of the shaped bloom about 1.0–1.3 times the flange width of the finished shape as shown in FIG. 3 at 11.

The shaped bloom is then rolled in a series of reversing passes in roughing universal mill 3 and edging mill 4 and, upon being discharged from roughing rolling mill trains 3 and 4, it is delivered to a finishing rolling mill train 5 in which the flanges are straightened and the flanges and the web are reduced slightly in thickness, using one or a few passes.

In these rolling stages (B part) consisting of the material cools naturally or is force cooled by, the material cools down by itself or gets forced cooling by water or air applied on the surface of the flange, thereby the temperature difference between the web and the flange is controlled to be kept within the range of 0–200° C. This cooling is performed at any desired position in the universal rolling stage (B). This controlling of the temperature difference between the web and the flange within the range of 0–200° C. is intended to attain uniform elongation of the web and the flange as much as possible in the universal rolling mill, and to prevent deformations, such as irregular bending or waviness in the web, in a finished product caused by the difference of shrinkage between the web and the flange. This invention is particularly effective to manufacture a steel H-shape having an extremely thin web, because such a thin web is very much susceptible to deformation.

Several back and forth passes are given the material in the roughing rolling mill stage, and the earlier passes are effective mostly for rolling the web portion. That is to say, the web portion is rolled with a larger degree of reduction than the flange portion. Thereafter it is necessary to roll the web and the flange keeping a balance of the reductions of the both portions in such a manner that the reduction of the flange is always a little larger than that of the web by about 2–7%. For example, in the case of 11–13 passes in the roughing universal rolling mill, it is desirable to provide reduction mainly on the web, at least in the first 3–5 passes. Thereafter 6–10 passes are given on the web and the flange keeping the balance between the reductions.

Rolling of the web portion mainly in the earlier passes in the roughing universal mill is to keep a good relationship of reduction between the web and the flange in the latter passes, and this balance of reduction in the latter passes is especially important to roll a steel H-shape having a web-flange thickness ratio of 1:2–3 because the web of such a H-shaped steel is more susceptible to abnormal deformation than the conventional one. Therefore it is necessary to take most of the reduction work on the web in earlier passes, while the web still keeps its strength and still is not very much susceptible to deformation because the temperature of material is still high and the web thickness is still considerably great.

The reason why the reduction of flange is kept larger than that of web by about 2–7% in the latter passes is to keep the form and shape of the H-shaped steel normal at the stage when the section approaches its finished profile, keeping the web under slight tension by both flanges which have a greater elongation.

In addition, a high degree of accuracy of sectional dimensions of a steel H-shape by this invention can be achieved making a proper selection of reduction at each pass in the edging mill when a proper shape and dimension is chosen for the edging rolls.

The rolled material having the web to flange thickness ratio of nearly 1:3 is then delivered to the finishing rolling mill train in which the flanges are straightened and finished in one pass or a few passes according to the condition. In this stage, it is desirable to maintain the temperature difference between the web and the flange of the material within a range of 0–200° C. and to make the reduction of flange larger than that of the web by 2–7%, the same as in the case of the roughing universal rolling stage. These reasons are the same as for the case of roughing rolling. The internal stress, generated within a steel H-shape during cooling, is small.

Examples of application of the above described method of this invention are shown in Table 2.

Referring to FIGS. 7 through 9, a rolling mill for rolling steel H-shapes, and embodying the invention, comprises housings 31, 32, 33 and 34 and chocks 35 and 36 for upper horizontal roll 37. The roll surface for rolling the web is indicated at 38, and those for rolling the inner surfaces of the flanges are indicated at 38'. Upper roll 38 is mounted in roll neck bearings 39. The inner sides of chocks 35 and 36 are provided with projections or brackets 310 through 313 arranged in aligned pairs on opposite sides of roll 37, and the two brackets of each oppositely aligned pair carry a respective support bar 314 or 315.

Chocks 35 and 36 support respective coolant headers 316 and 317 adjacent the upper part of upper horizontal roll 37, and these headers have nozzles 318 to spray coolant onto rolling surfaces 38 and 38'. Apertures for directing coolant onto roll neck bearings 39 are indicated at 319.

In FIG. 7, a lower horizontal roll is illustrated at 320 and is cooled in a suitable manner which has not been illustrated. Chocks 321 and 322 support vertical rolls 323 and 324, respectively, which are also cooled in a suitable manner which has not been illustrated. The work is illustrated at 325 and is generally rolled in the state shown in FIG. 8.

In such case, after cooling the rolling surfaces of upper horizontal roll 37 and roll neck bearings 39, coolant flows or leaks onto the web *a* of work 325 and thus increases the temperature difference between web *a* and flanges *b*. In accordance with the invention, this flowing down or leaking of coolant onto the web *a* is prevented as will now be described.

In each of FIGS. 7, 8 and 9, covers 326 and 327 are positioned between roll 37 and chocks 35 and 36, and the inner edges of these covers engage the flange rolling surfaces 38'. If these covers are made of hard material, they may hurt the flange rolling surfaces 38'. Thus, it is desirable to provide a soft material 328, such as felt, rubber, nylon, etc., for example, either on those portions of covers 328 which contact the flange rolling surfaces 38' or over the entire contacting surfaces of the covers. Troughs 330 and 331 extend the entire length of respective support bars 314 and 315 and are connected to the bottom ends of covers 326 and 327. As best seen in FIGS. 8 and 9, wipers 332, 333 of soft material, such as felt, rubber, nylon, etc., are mounted in troughs 330 and 331 and engage the web rolling surface 38 of upper roll 37.

As best seen in FIGS. 7 and 8, chutes 335 and 336 are supported by flexible means, such as ropes 337 engaged in roll grooves 334 between the roll body and the roll chocks of roll 37, and the discharge ends of these chutes rest on the chocks 321, 322 for the vertical rolls.

With the described arrangement, the coolant for the upper horizontal roll body is prevented by wipers 332 and 333 or covers 326 and 327 from dripping onto web *a*, and will flow down into troughs 331 and 332. The coolant in these troughs flows outwardly away from web *a*.

Flange rolling surfaces 38' of roll 38 generally have a slope at a right angle, and thus covers 326 and 327, which have a semi-circular configuration, closely contact the flange rolling surfaces so that coolant cannot leak between the covers and the flange rolling surfaces. The cooling water supplied to roll neck bearings 39 flows down both sides of chocks 35 and 36 and that falling down the inner surfaces of these chocks flows along chutes 335 and 336 onto chocks 321 and 322 and then outwardly along the surface of these latter chocks without contacting web *a* of the shape being rolled.

Using the apparatus of this invention, as explained in FIG. 7 through FIG. 9, in the rolling of steel H-shape in the universal rolling mill train, especially in the rolling of steel H-shape having large ratios of flange thickness to web thickness, or having an extremly thin web, it is possible to prevent completely the cooling water for the upper horizontal roll from flowing or leaking down onto the web of steel H-shape to be rolled. Thereby it is possible to prevent not only cooling of the web but also the carrying of scattered scale to the web, which causes scale injury, and also to prevent waviness in the web and irregular bending of the finished steel H-shape.

Thus the apparatus of this invention is very useful for manufacturing steel H-shapes having excellent profiles, properties and quality.

In FIG. 10, which shows a train of apparatus for manufacturing steel H-shapes by the method of universal rolling in general, (41) is a blooming mill, (42) a breakdown mill, (43) a roughing universal mill, (44) an edging mill, and (45) a finishing universal mill. Side-guides (46) which guide the work to each rolling mill, are provided at the entry and delivery sides of each rolling mill so as to hold the work in proper position, and the distance between the right and left guides (46) in FIG. 12 is adjustable according to the width of the work.

Side guides 46, which are an important feature of the invention, will be explained more fully with respect to FIGS. 11 through 14. As seen in FIG. 12, each side guide has the cross section of a rectangular tube providing a cavity 47 in which is mounted a coolant header 48 extending along the side guide. Each side guide has a wall 410 adjacent a respective flange of a steel H-shape being rolled, and each wall 410 has a guiding surface 411. Relatively short nozzles 49 communicate at their inner ends with each header 48 and extend through wall 410 with their outer ends being substantially flush with surface 411 of this wall. Supply pipes 412 deliver coolant to headers 48, and have their outer ends connected to valves 14 which may be, in turn, connected into flexible coolant supply pipes.

The quantity of coolant delivered to each header is controlled by adjustment of valve 413, and the coolant is sprayed through nozzles 49 against the outer surfaces of flanges 420 of H-shape 417 so that the flanges 420 are force cooled.

Since this invention utilizes side-guides provided with cooling apparatus, no special supports are required and thus no complicated installations on the entry and delivery sides of each rolling mill are needed. As the coolingn agent is sprayed from the nozzles in the guiding wall of the side-guide to the outer flange surfaces of steel H-shapes, the cooling water does not scatter and leak on the web and thereby prevents a temperature drop of the web. As the tips of the nozzles of the cooling apparatus do not stick out beyond the guiding wall, when the side guide guides the steel H-shape to each rolling mill, it is always possible to spray the cooling agent to the outer surfaces of the flange in a favorable state without breaking, blockade, etc. of the nozzles, even when the outer surface of the H-shape may touch the guide wall. Further, it is more effective for cooling to adjust suitably the distance between the coolant spraying nozzles and the flanges of the steel H-shape. Therefore, a feature of this invention is that the side guides are simultaneously utilized as cooling apparatus. FIG. 13 and FIG. 14 show a construction in which the position of coolant can be adjusted freely.

Referring to FIGS. 13 and 14, walls 410 are recessed, as at 414, at each of the nozzles, the center of these recesses being substantially mid-way of the flange width of the steeel H-shape. An offset pipe 415 constitutes a nozzle, and is threaded onto each nozzle 49, the offset pipe 415 being disposed within a recess 414 so that its discharge end does not project beyond the guiding surface 411. The position at which the coolant impinges on the flanges of the H-shape can be adjusted by rotating offset pipe 415.

As it is well known, various sizes of H-shaped steel are produced, and the height from the upper surface of the roller table of the joining part of the web and the flange varies corresponding to variation of the flange width. In this case, as is shown in FIG. 13 and FIG. 14, proper adjustment can be easily made in the bend-pipe to correspond to the height of the jointed portion of the flange to the web.

For the cooling agent in this case, high pressure water is mainly used as in the preceding cases, but Freon gas and high pressure steam, etc. may also be used.

As explained above in detail, the invention makes possible the successful prevention of waviness and distortion

TABLE 1

|  | Application | Example 1 | Example 2 | Example 3 |
|---|---|---|---|---|
|  | Train of apparatus for manufacturing H-shaped steel. | Fig. 5. | Fig. 5. | Fig. 5. |
| Kind of product. | Size | 892 x 299 x 14/32 | 606 x 302 x 14/35 | 876 x 296 x 11/16 |
|  | Thickness of web/thickness of flange | 1:2.29 | 1:2.50 | 1:1.45. |
|  | Height of web/width of flange | 3:1 | 2:1 | 3:1. |
|  | Kind of steel | Semi-killed, killed. | | |
| Roughing universal rolling process. | Cooling agent | High pressure water. | | |
|  | Cooling position | Outer surface of jointed portions of the flanges to the web. | | |
|  | Condition for spraying of water. — No. of nozzle | Total 40. | | |
|  | Nozzle angle | Perpendicular to the material to be rolled. | | |
|  | Velocity of water | 4–5 m./sec. | | |
|  | Quantity of water | 0.5–0.8 m.³/sec./nozzle. | | |
|  | No. of roll-pass | 13–19 passes (in the latter, 5 passes cooling). | | |
|  | Velocity of rolling | 2–6 m./sec., 2–4 m./sec. at cooling passes. | | |
|  | Others | Preventing apparatus for dropping of cooling water and high pressure steam are used in combination. | | |
| Finishing universal rolling process. | Cooling agent | High pressure water. | | |
|  | Cooling position | Outer surface of jointed portion of the flanges to the web. | | |
|  | Condition for spraying of water. — No. of nozzle | Total 24. | | |
|  | Nozzle angle | Perpendicular to the material to be rolled. | | |
|  | Velocity of water | 4–5 m./sec. | | |
|  | Quantity of water | 0.5–0.8 m.³/sec./nozzle. | | |
|  | No. of roll-pass | 3–7 passes (all cooling passes). | | |
|  | Velocity of rolling | 1 pass with 5 m./sec., others with 0.5–1.5 m./sec. | | |
|  | Others | Preventing apparatus of dropping of cooling water under high pressured steam are used in combination. | | |
| Temperature difference between web and flange before and after finish rolling according to this invention. | Before finish rolling | 150–200° C. | | |
|  | After finish rolling | About 40° C. | About 40° C. | About 30° C. |

TABLE 2

|  | Application | Example 4 | Example 5 | Example 6 |
|---|---|---|---|---|
|  | Train of apparatus for manufacturing H-shaped steel. | Fig. 1. | Fig. 1. | Fig. 1. |
| Kind of product | Size | 528 x 200 x 10/30 | 620 x 300 x 12/36 | 512 x 301 x 12/30. |
|  | Web thickness : flange thickness | 1:3 | 1:3 | 1:2.5. |
|  | Web height : flange width | 2.64:1 | 2.06:1 | 1.7:1. |
|  | Kind of material | Semi-killed | Semi-killed | Semi-killed. |
| Beamblank | Web thickness (mm.) | 55 | 50 | 60. |
|  | Flange mean thickness (mm.) | 125 | 140 | 140. |
|  | Web thickness : flange average thickness | 1:2.27 | 1:2.8 | 1:2.34. |
|  | Flange width : Beamblank flange width | 1:1.17 | 1:1.15 | 1:1.15. |
| Roughing universal rolling condition | No. of pass | 11 | 13 | 13. |
|  | No. of pass in the first half | 4 | 5 | 5. |
|  | Increase of reduction of flange in the latter half | Average 3% | Average 3.5% | Average 3.5%. |
|  | No. of pass in the latter half | 7 | 8 | 8. |
|  | Time of cooling | In all passes. | | |
|  | Cooling procedure | Outer surface of jointed portions of the flanges to the web. | | |
|  | Cooling agent | High pressure water. | | |
|  | Spraying condition — No. of nozzle | 60 in total. | | |
|  | Nozzle angle | Perpendicular to the material to be rolled. | | |
|  | Quantity of flow | 4–5 m./sec. | | |
|  | Velocity of flow | 0.5–0.8 m.³/sec./nozzle. | | |
|  | Cooling position | Entry side of roughing universal mill, between roughing universal stand and edging stand. | | |
|  | Temperature — Web | 730° C. | 760° C. | 770° C. |
|  | Flange | 880° C. | 900° C. | 880° C. |
|  | Temperature difference. | 150° C. | 140° C. | 110° C. |
|  | Velocity of rolling | 2.5 m./sec. | 2.5 m./sec. | 2.5 m./sec. |
| Finishing universal rolling condition | No. of pass | 1 | 1 | 1. |
|  | Increase of reduction of flange | 3% | 3.5% | 3.5%. |
|  | Cooling | None | None | None. |
|  | Finishing temperature — Web | 680° C. | 720° C. | 730° C. |
|  | Flange | 870° C. | 880° C. | 860° C. |
|  | Temperature difference. | 190° C. | 160° C. | 130° C. |
|  | Velocity of rolling | 5 m./sec. | 5 m./sec. | 5 m./sec. | in the webs of steel H-shapes, by maintaining the temperature difference between the web and flanges at a very small value, particularly when a steel H-shape having a very large ratio of flange thickness to web thickness, as compared with a nominal value, or having an extremely thin web, is produced. Thus, it is possible to produce steel H-shapes having excellent profiles and properties and of great industrial value.

What is claimed is:

1. A method for manufacturing a steel H-shape having a large ratio of flange thickness to web thickness, or having an extremely thin web, by hot rolling, comprising the steps of shaping a hot steel ingot to form a bloom having roughly an H-shape profile; subjecting said bloom to a hot rolling stage to reduce said profile to the desired H-finished shape; and during such hot rolling stage, subjecting the flanges to a substantially greater cooling than that to which the web is subjected to maintain the temperature difference between the web and the flanges at a minimum.

2. A method for manufacturing a steel H-shape which comprises rough rolling a steel ingot into a steel bloom having roughly an H-shape profile and having a ratio of web to flange thickness of about 1:2 to 3, then reducing the bloom in a plurality of passes in a rough universal rolling stage in which, in the earlier passes, the web is reduced to a greater extent than are the flanges, during the rough universal rolling stage maintaining the temperature difference between the web and flanges within the range of substantially 0–200° C., during later passes in the rough universal rolling stage effecting a reduction of the flanges by about 2–7% more than the reduction of the web to obtain a web to flange thickness ratio of about 1:3.

3. Apparatus for manufacturing a steel H-shape comprising, in combination, plural longitudinally spaced roll stands each including upper and lower horizontal rolls rotatable about horizontal substantially parallel axes and having roll surfaces engageable with the web and the inside surfaces of the flanges of a steel H-shape, and side rolls rotatable about vertical substantially parallel axes and having roll surfaces engageable with the outer surfaces of the flanges of a steel H-shape; means applying coolant to said rolls; relatively elongated guiding means positioned before and after each roll stand on opposite sides of a steel H-shape passing through said roll stand and having guiding surfaces facing the external surfaces of said flanges; nozzles included in said guiding means and discharging through said guiding surfaces toward said flanges; means for supplying coolant to said nozzles for discharge against said flanges; and means adjustably mounting said nozzles.

4. Apparatus as claimed in claim 3, in which each of said nozzles is arranged to direct coolant onto the associated flange at substantially the longitudinal center line thereof, the distance of the discharge end of each nozzle from the associated flange being not less than the distance of the associated guiding surface from the associated flange.

5. Apparatus as claimed in claim 3, in which each nozzle is mounted in a respective recess in the associated guiding surface, the discharge end of each nozzle terminating short of the associated guiding surface.

6. A universal rolling mill particularly adapted for manufacturing steel H-shapes having a large ratio of flange thickness to web thickness, said rolling mill comprising, in combination, a universal roll stand including upper and lower rolls having rolling surfaces engageable with the web and the inner surfaces of the flanges of a steel H-shape; first laterally spaced chocks mounting said upper roll for rotation about a horizontal axis; second laterally spaced chocks mounting said lower roll for rotation about a substantially horizontal axis substantially parallel to the axis of rotation of said upper roll; a pair of side rolls having roll surfaces engageable with the outer surfaces of said flanges; third chocks supporting said side rolls for rotation about laterally spaced and substantially parallel vertical axes; means directing liquid coolant against the upper surface of said upper roll whereby said coolant will normally flow downwardly toward the workpiece; a pair of covers extending around the upper portion of said upper roll between each first chock and the flange engaging surface of said upper roll; a pair of troughs each extending the full distance between said first chocks and each connected to a respective end of each cover; a pair of wipers each mounted on a respective trough and engaging the web contacting surface of the upper roll; and chutes each having an upper end positioned between the body of said upper roll and a respective first chock, and a lower end supported on a respective third chock.

References Cited
UNITED STATES PATENTS

| | | | |
|---|---|---|---|
| 1,812,248 | 6/1931 | Oberg | 72—366 |
| 1,936,582 | 11/1933 | Clapp | 72—201 |
| 2,811,059 | 10/1957 | Appleby | 72—201 |
| 2,849,905 | 9/1958 | Heinz | 72—201 |

CHARLES W. LANHAM, *Primary Examiner.*

H. D. HOINKES, *Assistant Examiner.*